United States Patent [19]

Oetiker

[11] Patent Number: 5,333,360
[45] Date of Patent: Aug. 2, 1994

[54] EXPANDABLE CLAMP STRUCTURE OF THE EARLESS TYPE

[75] Inventor: Hans Oetiker, Horgen, Switzerland

[73] Assignee: Hans Oetiker AG Mashinen- und Apprate-fabrik, Switzerland

[21] Appl. No.: 958,765

[22] Filed: Oct. 9, 1992

[51] Int. Cl.⁵ .............................................. F16L 33/02
[52] U.S. Cl. ................................................ 24/20 R
[58] Field of Search ............. 24/20 R, 20 EE, 20 TT; 285/420, 217, 162; 464/173, 175

[56] References Cited

U.S. PATENT DOCUMENTS

| | | | |
|---|---|---|---|
| 3,160,425 | 12/1964 | Sinnott | 285/420 X |
| 4,478,437 | 10/1984 | Skinner | 24/20 EE X |
| 5,029,907 | 7/1991 | Gundy | 285/162 X |
| 5,150,927 | 9/1992 | Skinner | 24/20 EE X |

FOREIGN PATENT DOCUMENTS 1347808 11/1963 France ................................ 464/173

*Primary Examiner*—James R. Brittain
*Attorney, Agent, or Firm*—Paul M. Craig, Jr.

[57] ABSTRACT

An externally expandable earless clamp structure, in which a hook-like member in the outer band portion is adapted to engage in a hook-receiving aperture in the end area of the inner band portion to connect the overlapping band portions, a first inwardly pressed-out tool-engaging embossment in the inner band portion is adapted to cooperate with a second inwardly pressed-out tool-engaging embossment in the outer band portion to permit tightening of the clap structure by expansion thereof; and an inwardly pressed-out tab-like member in the outer band portion extending in the longitudinal direction is adapted to engage in a narrow slot in the inner band portion.

36 Claims, 5 Drawing Sheets

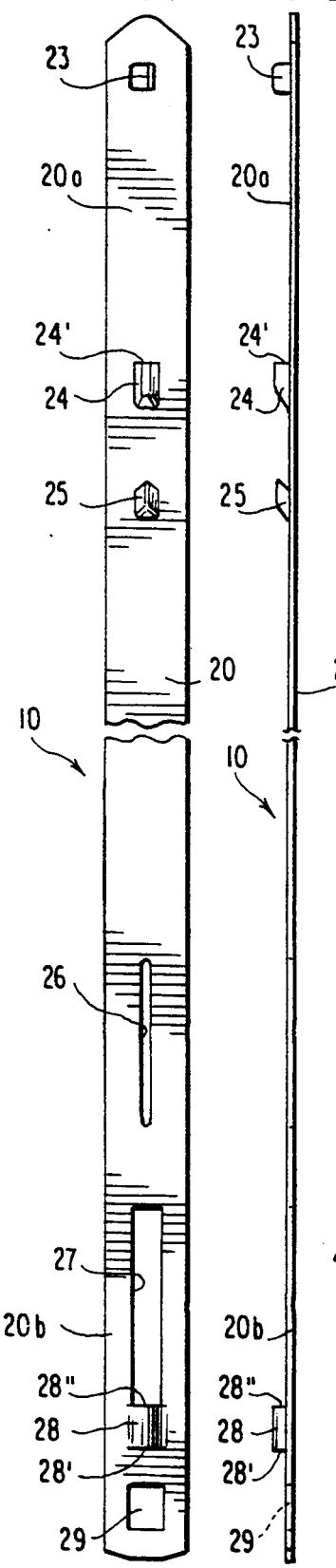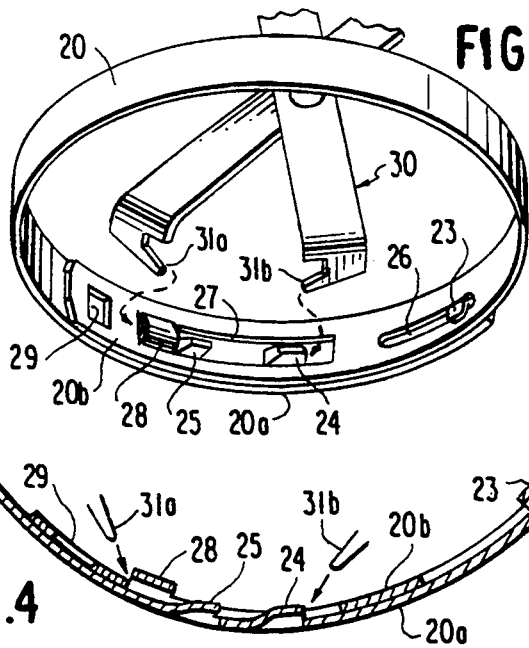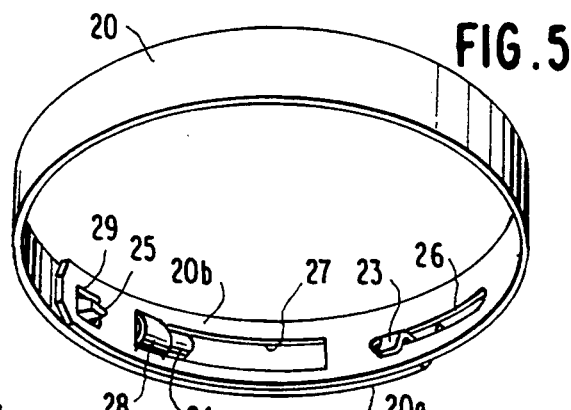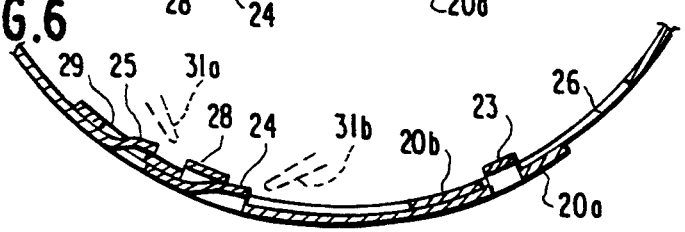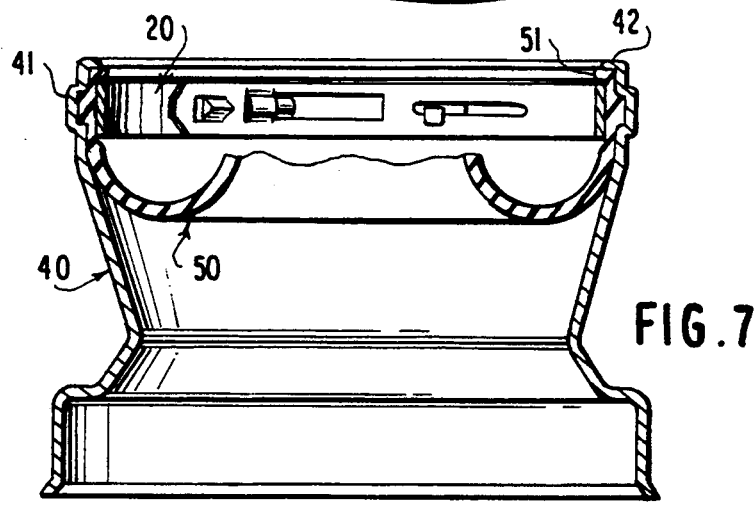

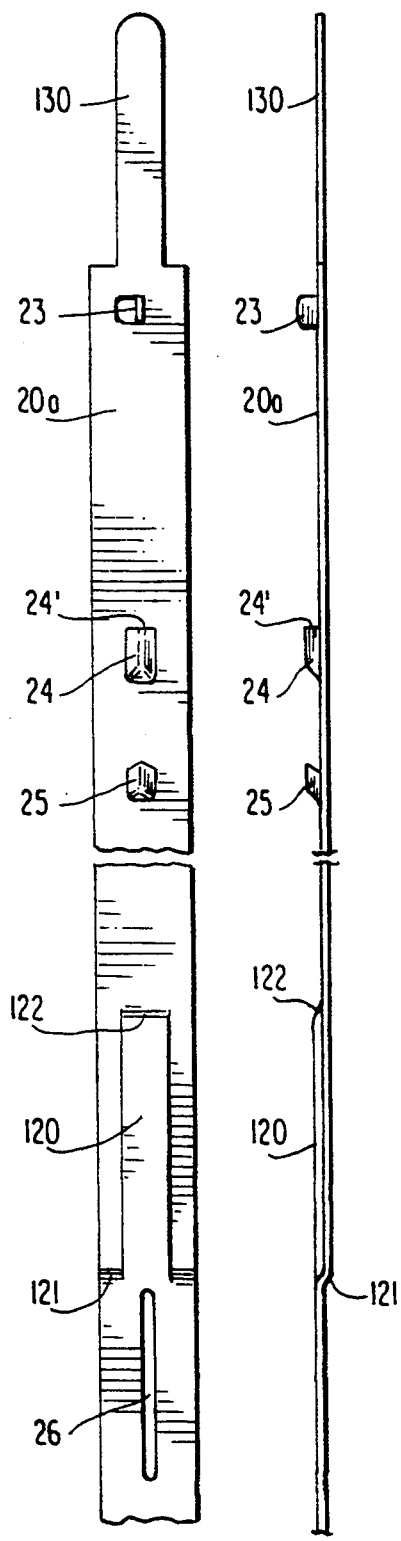
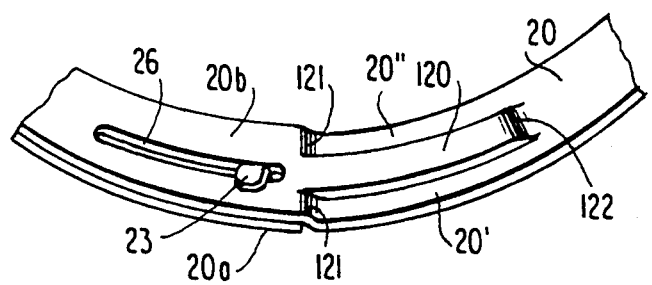
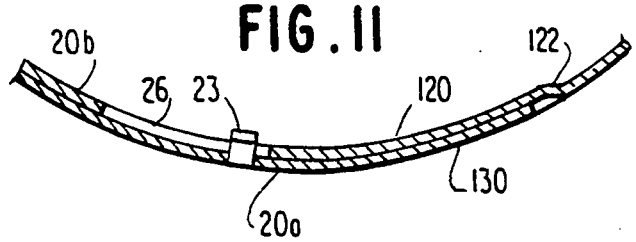
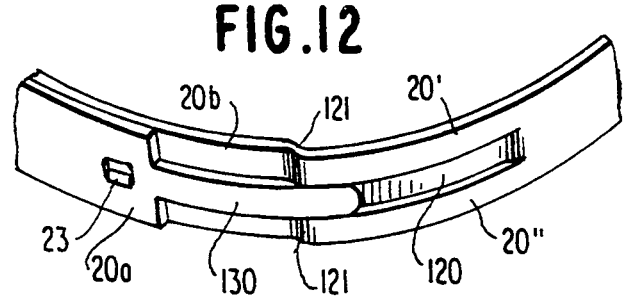
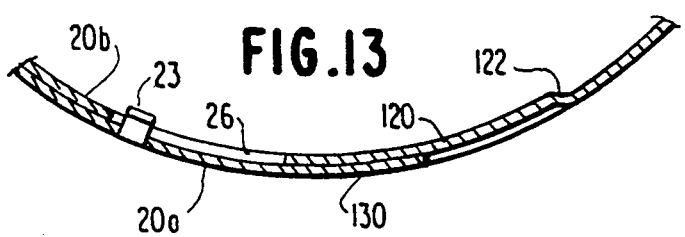

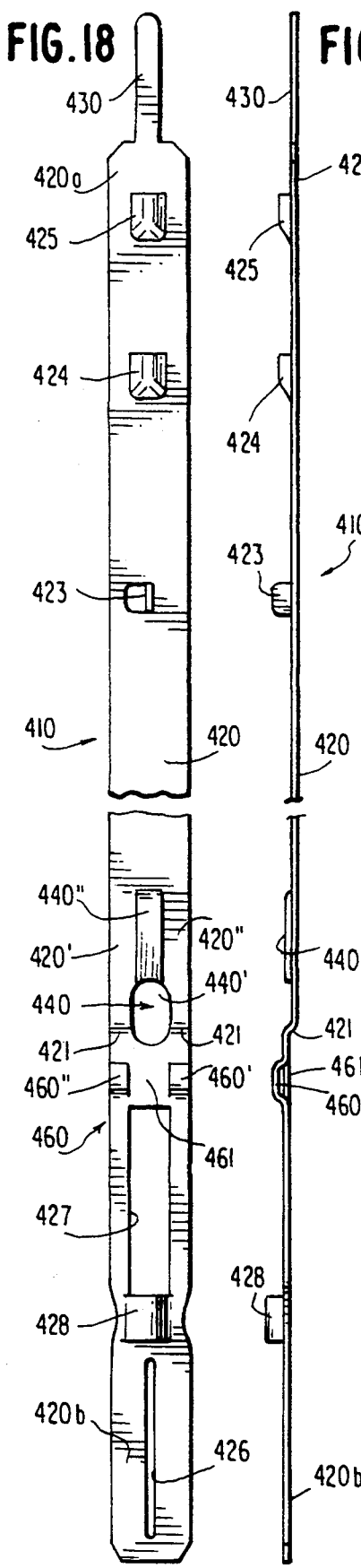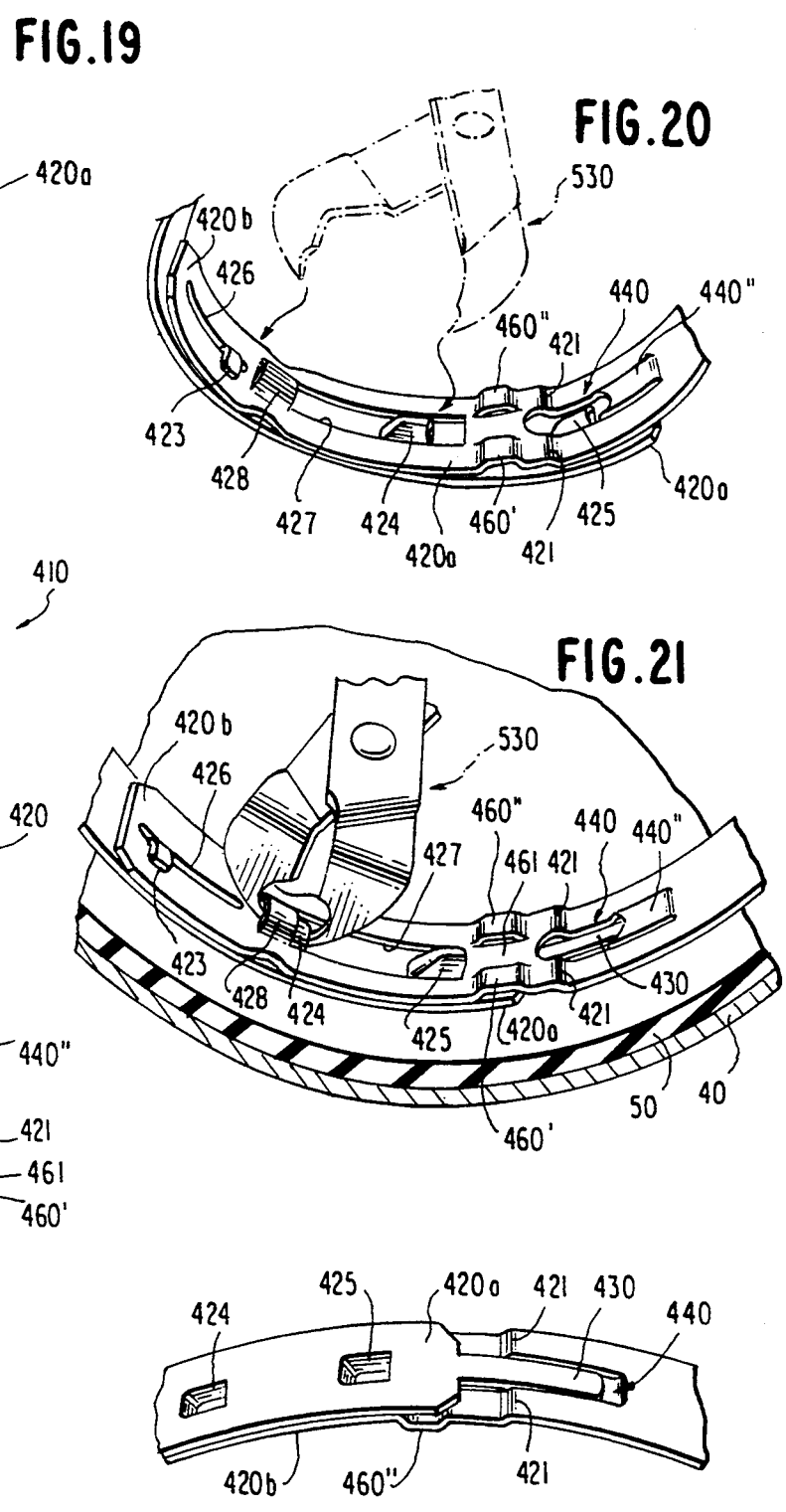

EXPANDABLE CLAMP STRUCTURE OF THE EARLESS TYPE

The present invention relates to a clamp structure which retains an object to be fastened by expansion of its diametric dimension, and in particular to a so-called earless-type clamp structure which is adapted to secure an object to be fastened by an increase in its diametric dimensions.

BACKGROUND OF THE INVENTION

So-called earless clamp structures are disclosed in my prior U.S. Pat. Nos. 4,492,004 and 4,712,278. These prior art clamp structures operate to secure objects, such as hoses and axle boots by reducing the circumferential length of the clamp structure in its installed condition so as to decrease the diametric dimensions thereof. These prior art earless clamp structures offer the advantage of a low profile and reusability by permitting disassembly of the clamp structure from the object by reopening the mechanical connection. These prior art earless clamp structures were thereby mounted externally over the object to be fastened.

Diaphragm boot designs are presently used in the automotive industry which are located on and secured to the inner tapered surface of so-called can members attached to the end of the drive shafts and made of spun steel. A carbon steel ring, machined with matching taper is pressed into the can member to secure the boot in order to provide a leak-free grease seal. Problems arise with this type of construction in the replacement of the boot and regreasing of the bearings. In case of a damaged boot, a complete drive shaft renewal was required heretofore.

SUMMARY OF THE INVENTION

It is therefore an object of the present invention to provide a clamp structure which obviates the aforementioned shortcomings and drawbacks encountered with the prior art in a simple and cost-effective manner.

Another object of the present invention resides in a clamp structure which is reusable so as to allow servicing of the boot in a manner that reduces repair, maintenance and warranty costs.

A further object of the present invention resides in a clamp structure which secures the object to be fastened thereby by expansion of the clamp structure and which requires only minor modifications in the design of the spun steel parts used heretofore.

The problems are solved according to the present invention in that the clamp structure in accordance with the present invention is mounted internally of the object to be fastened and applies the required clamping forces by expansion against the internal surfaces of the boot as contrasted with the prior art externally mounted clamp structures which are reduced in diameter to apply compressive forces on the object to be fastened. According to the present invention, the clamp structure is so arranged that the hook forming part of the mechanical connection extends from the outer band portion inwardly to engage in an-opening provided near the free end of the inner band portion. The tool-engaging embossments are so arranged that the inwardly extending tool-engaging embossment in the outer band portion is adapted to engage in a longitudinal slot provided in the inner band portion and is able to slide underneath the inwardly extending tool-engaging embossment provided in the inner band portion. The parts are thereby so located that the inwardly extending hook in the outer band portion can engage in the corresponding aperture in the inner band portion when the clamp structure has been expanded to a predetermined increased diametric dimension producing the predetermined externally directed clamping forces.

According to another feature of the present invention, a bent-out hook extending inwardly from the outer band portion is adapted to engage in a narrow slot in the inner band portion so as to guide the inner and outer band portions relative to one another during installation of the clamp structure. Moreover, by properly selecting the length of the narrow slot, over-torquing during tightening of the clamp can be avoided by abutment of the inwardly bent-out hook at the end of the slot after the clamp has been expanded to the point where the inwardly extending hooks in the outer band portion are able to engage into the corresponding apertures in the inner band portion, a very slight extra length of the slot being helpful when the reusable clamp is to be disassembled. However, this can be done without damaging over-torquing yet permits disassembly of the clamp by being able to apply the necessary force to cause disengagement of the hook from the apertures.

The clamp according to the present invention is thereby installed by applying a tool to oppositely disposed surfaces of the tool-engaging embossments so that contraction of the tools' jaws will cause the tool-engaging embossments to approach one another and thereby cause the clamp structure to increase its diametric dimension.

According to a further feature of the present invention, means are provided in the clamping band to facilitate disassembly of the clamp for repair and maintenance purposes which are in the form of inwardly pressed-out embossments that extend in the longitudinal direction of the clamping band in the lateral areas thereof. With a clamp structure devoid of any step at the free end of the overlapping outer band portion, these longitudinally extending disassembly-facilitating embossments intended to accommodate a disassembly tool, such as a small screwdriver, are located within an area adjoining the step-like portion in a direction toward the free end of the inner band portion.

According to still another feature of the present invention, the parts in the clamp structure are so arranged according to this invention that the outer clamping surface is devoid of any step at the overlapping end of the outer band portion.

According to still another feature of the present invention, the clamp structure may also be provided with separate tool-engaging surfaces in the inner and outer band portions for tightening and disassembling the clamp structure.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 1 is a plan view on the flat blank of a clamp structure in accordance with the present invention;

FIG. 2 is a right side elevational view of the clamp structure of FIG. 1;

FIG. 3 is a perspective view illustrating the clamp structure in the preassembled condition;

FIG. 4 is a partial longitudinal cross-sectional view, illustrating the parts of the clamp structure in the position illustrated in FIG. 3;

FIG. 5 is a perspective view of the clamp structure in accordance with the present invention, similar to FIG. 3, but illustrating the parts thereof in the installed position of the clamp;

FIG. 6 is a partial longitudinal cross-sectional view, similar to FIG. 4, but illustrating the parts of the clamp structure in their position shown in FIG. 5;

FIG. 7 is an axial cross-sectional view illustrating the use of the clamp structure to fasten a boot to a can member fixed to the end of a drive shaft;

FIG. 8 is a plan view, similar to FIG. 1, on the flat blank of a modified clamp structure in accordance with the present invention;

FIG. 9 is a right side elevational view of the clamp structure of FIG. 8;

FIG. 10 is a partial perspective view illustrating the clamp structure of FIGS. 8 and 9 in the preassembled condition;

FIG. 11 is a partial longitudinal cross-sectional view, illustrating the parts of the clamp structure in the position illustrated in FIG. 10;

FIG. 12 is a partial perspective view illustrating the clamp structure of FIGS. 8 and 9 in the installed position of the clamp;

FIG. 13 is a partial longitudinal cross-sectional view, similar to FIG. 11, but illustrating the parts of the clamp structure in their position shown in FIG. 12;

FIG. 18 is a top plan view on the inner surface of a flat blank of a still further modified embodiment of a clamp in accordance with the present invention;

FIG. 19 is a right side elevational view of the clamp of FIG. 18;

FIG. 20 is a partial perspective view on the inside of the already closed clamp of FIGS. 18 and 19 in the non-tightened condition;

FIG. 21 is a partial perspective view, similar to FIG. 20, on the inside of the clamp structure of FIG. 20 but showing the same in the already expanded, tightened position;

FIG. 22 is a partial top plan view on the clamp structure of FIG. 21 in the tightened position;

DETAILED DESCRIPTION OF THE DRAWINGS

Figure 14:
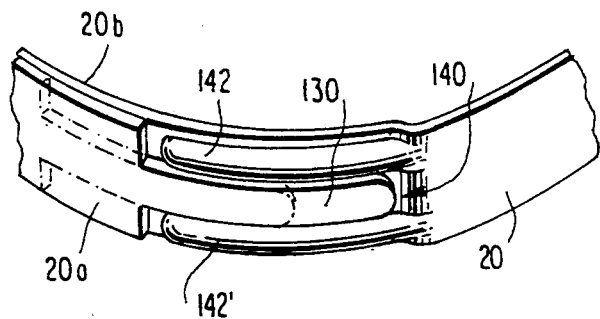
FIG. 14 is a partial perspective view of a still further modified embodiment of a clamp structure in accordance with the present invention.

Referring now to the drawing wherein like reference numerals are used throughout the various views to designate like parts, the clamp structure generally designated by reference numeral 10 includes a clamping band 20 made from any suitable material such as stainless steel or galvanized steel which is cut to appropriate length from a roll of band material to provide a flat blank and is stamped out as a flat blank to provide the following features. Starting from the end of what will constitute the outer band portion 20a, the clamp structure includes a tab-like longitudinally extending guide hook 23 bent out of the band material at approximately right angle whereby its tip can be bent over once more at substantially right angle in the preassembled condition of the clamp structure so as to extend more or less parallel to the inner surface of the inner clamping band portion 20b and thereby lock the clamp in the preassembled condition. A cold-deformed tool-engaging embossment 24 pressed inwardly out of the outer band portion 20a follows the hook 23 and is preferably integral with the outer clamping band portion 20a except along a transverse cut 24' so that it forms a more or less semi-circular opening within the area of the transverse cut 24' for engagement by the tip portion 31b of the fastening tool generally designated by reference numeral 30 (FIG. 3). Next adjoining the tool-engaging embossment 24 in a direction away from the free end of the outer band portion 20a is an inwardly extending support hook 25 which forms part of the mechanical connection for connecting overlapping outer and inner band portions 20a and 20b, respectively. The support hook 25 may be of any known construction such as shown, for example, in my aforementioned U.S. Pat. Nos. 4,492,004 or 4,712,278.

Proceeding in the direction toward the free end of the inner band portion 20b is a narrow longitudinal slot 26 for engagement by the guide hook 23 which, in turn, is adjoined by a wider longitudinal slot 27. At the end of slot 27 near the free end of the inner band portion 20b is another cold-deformed inwardly extending tool-engaging embossment 28 which is integral with the inner band portion 20b along its longitudinal sides. The tool-engaging embossment 28 is thereby pressed out inwardly after transverse cuts 28' and 28" whereby the thus-formed more or less semi-circular opening provides for the engagement by the tip portion 31a of the fastening tool 30. An opening 29 is provided between the tool-engaging embossment 28 and the free end of the inner band portion 20b for engagement by the inwardly extending support hook 25. The tool-engaging embossments are of at least approximately complementary shape so that the tool-engaging embossment 24 can slide under the tool-engagement embossment 28 during tightening of the clamp.

The clamp structure shown in FIGS. 1 and 2 is bent in such a manner that the guide hook 23 in the form of an inwardly directly circumferentially extending tab-like member can engage into narrow slot 26 and the support hook 25 as well as the tool-engaging embossment 24 extend inwardly through the slot 27. Preassembly of the parts is attained by simply bending over the outer end of guide hook 23 so as to extend substantially parallel to the inner surface. By applying pressure by means of the fastening tool 30 onto the tool-engaging embossments 24 and 28 as schematically indicated in FIGS. 3 and 4, the clamp structure will increase its effective circumferential length and therewith its diametric dimension until the parts reach the position shown in FIGS. 5, 6 and 7 in which the hook-like support member 25 engages in opening 29. The dimensions and locations of the various parts are thereby so chosen that in the position of the clamp structure shown in FIGS. 5 through 7, the clamp 20 presses the boot generally designated by reference numeral 50 against the internal surface of the can member generally designated by reference numeral 40, the shape of which forms no part of the present invention except for the annular groove 41 provided near its inwardly extending rim portion 42 that contribute to the secure fastening of the boot 50 to the can member 40. By properly selecting the length of slot 26 in relation to the installed condition of the clamp structure, abutment of guide hook 23 at the end of slot 26 nearer the free end of the inner band portion 20b may be used to prevent over-torquing during tightening.

The present invention offers a number of advantages. First, the clamp structure in accordance with the present invention is reusable, i.e., can be reopened by simply lifting the opening 29 out of engagement with the hook-like support member 25. A reduction in repair, maintenance and warranty costs is assured thereby. Second, the tight seal achieved with the clamp structure in accordance with the present invention provides a readily serviceable product assuring a joint performance which does not deteriorate.

The clamp can be preassembled into the position shown in FIGS. 3 and 4 in which it can be supplied to the customer in the thus-reduced dimensions. Drawing together the two tool-engaging embossments 24 and 28 causes the outer diameter of the clamp structure to expand until the support hook 25 can engage in opening 29. By drawing the two tool-engaging embossments 24 and 28 toward one another, the outer diameter of the clamp structure is expanded as a result of the particular constriction and location of its parts. All protruding parts of the clamp structure are located along the internal circumference of the clamp structure so that the smooth external surface of the clamping band is able to compress the boot material against the internal surface of the can member 40 to force the boot material into the annular groove 41 and preclude its movement in the axial direction by the boot rim portion 51 which is clamped fast between the clamp structure 20 and the rim portion 42 of the can member 40.

The only modification required in the presently used can members and boots is the need to replace the locking taper configuration with the straight surface of the annular groove 41 as shown in FIG. 7.

The embodiment of the clamp structure illustrated in FIGS. 8–13 differs from the clamp structure of FIGS. 1–7 only by an arrangement which effectively provides an external clamping surface devoid of any step. This is achieved by the use of a tongue-like extension 130 at the end of the outer clamping band portion 20a which is adapted to slidingly engage in a central pressed-out torque-receiving channel 120 which is pressed out from the inner band portion 20b in the radially inward direction. The tongue-receiving channel 120 is thereby formed between two step-like portions 121 and 122 whereby the channel 120 is pressed out in the radially inward direction after one or several longitudinal cuts leaving lateral band portions 20' and 20" on both sides thereof. Step-like portions 121 thereby raise the lateral band portions 20 and 20" to the height of the channel 120 so that the full band width is again available in the inner band portion 20b to the left of step-like portions 121 (FIGS. 10 and 12). The arrangement is thereby made in a manner somewhat analogous to that disclosed in my prior U.S. Pat. No. 4,299,012. As the circumferential length of the clamp structure increases during expansion thereof into the installed condition, the tongue-like extension 130 will slide in a direction in which its immersion in the tongue-receiving channel 120 decreases. In other words, the outwardly exposed length of the tongue-like extension 130 between the step-like portions 121 and the end of the outer band portion 20a increases. However, with an appropriate depth of the tongue-receiving channel 120 corresponding substantially to the thickness of the clamping band and the height of the step-like portions bringing the lateral band portions 20' and 20" to the normal diametric dimension of the inner band portion 20b, the greater length of the exposed tongue-like portion 130 does not impair the holding ability of the clamp structure as the tongue-like extension 130 is positively guided intermediate the step-like portions 121 and the end of the outer band portion 20a by abutment at the outer surface of the inner band portion 20b which has the full band width within this area. Moreover, by appropriately selecting the length of the tongue-receiving channel 120 and the length of the tongue-like extension 130 and dimensioning the clamp in such a manner that its expansion from its preassembled position to the installed position involves an increase in the circumferential length, which is as small as acceptable by hose tolerances, etc., the length of exposed tongue-like portion 130 can be minimized.

FIG. 14 illustrates a modified embodiment of a clamp structure in accordance with the present invention in which the inner band portion 20b is provided with an arrangement somewhat analogous to my prior U.S. Pat. No. 4,237,584 to achieve an external clamping surface devoid of any steps. More particularly, the inner band portion 20b is provided with pressed-out embossments 142 and 142' forming in effect a U-shaped fork-like tongue-receiving channel generally designated by reference numeral 140 to receive the tongue-like extension 130 at the end of the outer band portion 20a. The arrangement is thereby made in such a manner that the ends of pressed-out embossments 142 and 142' which are disposed opposite the free end of the inner band portion 20b, i.e., the right ends as viewed in FIG. 14 merge smoothly into the remaining areas of the inner band portion so that the full band width exists again to the right thereof and the outer clamping surface of the clamp structure has a circular configuration defined by outer band portion 20a, tongue-like extension 130 adjoined laterally by embossments 142, 142' and the extension of the inner band portion 20b at the right end of embossments 142 and 142' which is devoid of any step or offset in the continuous effective clamping surface. As to the rest, what was said in connection with the embodiment of FIGS. 8 to 13 as also what was said in connection with FIGS. 7–10 of my prior U.S. Pat. No. 4,237,584 applies to this modification, in which the radial height of embossments 142 and 142' corresponds to the thickness of the clamping band material.

Figure 15:
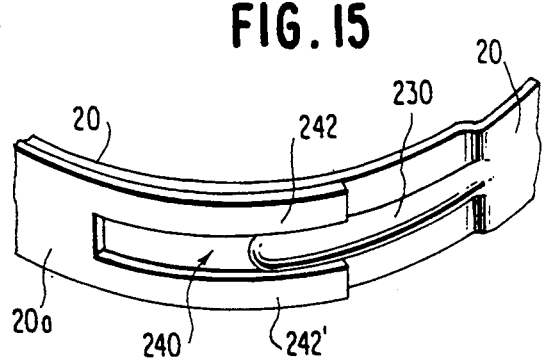
FIG. 15 is a partial perspective view on still another modified embodiment in accordance with the present invention.

FIG. 15 illustrates a still further modified embodiment in accordance with the present invention which is merely a reversal of the parts of the embodiment of FIG. 14. More particularly, the end of the outer band portion 20a is provided in this embodiment with a U- shaped fork-like tongue-receiving channel generally designated by reference numeral 240 formed by lateral fork-like portions 240 and 242' and intended to receive the tongue-like extension 230 pressed out of the inner band portion 20b The pressed-out embossments 142, 142' of FIG. 14 as well as the pressed-out embossment 130 of FIG. 15 are pressed radially outwardly by a distance corresponding to the thickness of the band so that an outer clamping surface can be achieved devoid of any step at the end of the outer clamp portion. As to the rest, what was said in connection with the embodiment of FIG. 14, also applies to the embodiment of FIG. 15.

Figure 16:
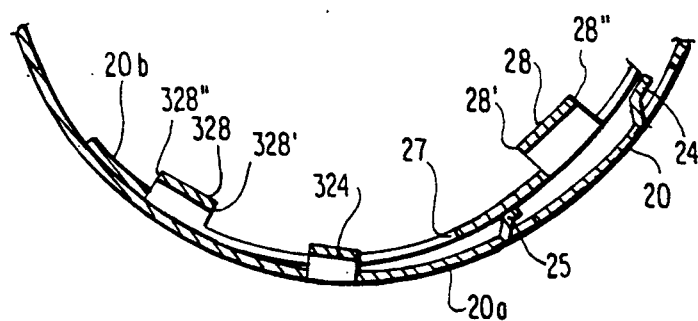
FIG. 16 is a partial longitudinal cross-sectional view of a still further modified clamp structure in accordance with the present invention, illustrating the various parts thereof in the installed but not yet tightened condition.
Figure 17:
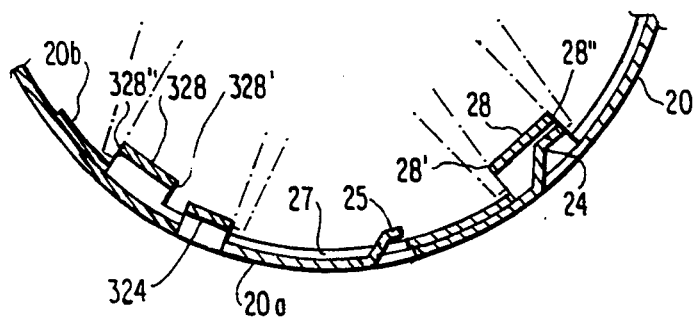
FIG. 17 is a partial longitudinal cross-sectional view, similar to FIG. 16, but illustrating the parts thereof in the installed, tightened condition.

The embodiment of the clamp structure of FIGS. 16 and 17 differs from the preceding embodiments by a structural arrangement precluding over-torquing during tightening and facilitating disassembly of the clamp structure. Differing from FIGS. 1–15, the embossment 328 which is again at least approximately semi-circularly shaped and may have a configuration similar to embossment 28 and integral with the inner clamping band portion 20b, includes end surfaces 328' and 328" of which the end surface 328" constitutes a tool-engaging surface for the application of disassembly forces. A pressed-out tool-engaging clamp releasing embossment 324 for releasing the clamp which may have a configuration similar to that of embossment 24 is provided in the outer band portion 20a. The pressed-out tool-engaging embossments 28 and 24 again constitute with their tool-engaging abutment surfaces the means for tightening the clamp structure. The tool-engaging pressed-out embossments 324 and 328 constitute with their tool-engaging surfaces the release means to reopen the clamp.

In operation to tighten the preformed clamp structure, it is only necessary to press the opposite jaws of a tool against the tool-engaging surfaces of the clamp-tightening embossments 28 and 24 until the hook(s) 25 reach the corresponding aperture(s). If it is now desired to reopen the clamp structure, i.e., disassemble the same for subsequent reuse, it is only necessary to apply a reopening force to the tool-engaging, clamp-releasing embossments 324 and 328 by a similar tool as used for tightening until hook(s) can clear the corresponding aperture(s).

Over-torquing during tightening of the clamp structure of FIGS. 16 and 17 is avoided by the particular location of the clamp-tightening embossments 24 and 28 in the clamping band and their complementary cross-sectional configuration such that the tool-engaging surface of embossment 24 is almost flush with the abutment surface 28" of the tool-engaging embossment 28 as the embossment 24 slides underneath the embossment 28 during tightening when the hook(s) are about to engage with the corresponding aperture(s) so that further tightening of the clamp structure now becomes impossible by abutment of the jaw of the tightening tool, which is in engagement with the tool-engaging surfaces 24' and which now also abuts at the abutment surface 28" as disclosed in an analogous manner in my copending application Ser. No. 07/886,337, filed on May 20, 1992, and entitled "Reusable Earless Clamp Structure", the contents of which are incorporated herein by reference. The embodiment of FIGS. 16 and 17 may thereby also include details such as undulations in the clamping band as disclosed in the copending application to prevent over-torquing during disassembly or the use of a slot 26 in conjunction with member 23, as explained above.

To achieve an external clamping surface in the embodiment of FIGS. 16 and 17 devoid of discontinuity or step, any of the arrangements of FIGS. 8–15 may also be used.

FIGS. 18 through 24 illustrate a preferred modified embodiment of a clamp structure in accordance with the present invention in which reference numerals of the 400 series are used to designate parts corresponding to the previous embodiments. The clamp structure of FIGS. 18 through 23 generally designated by reference numeral 410 includes again a clamping band 420 whose inner and outer clamping band portions 420b and 420a respectively overlap in the closed condition of the clamp structure. Proceeding from the inner clamping band end 420b toward the outer clamping band end 420a, a narrow longitudinal slot 426 is adjoined by the inwardly extending first tool-engaging embossment 428 which is followed by the wider longitudinal opening 427. A tongue-receiving means generally designated by reference numeral 440 commences in the area of the step-like portions 421 which raise the lateral band portions 420' and 420" remaining on both sides of the tongue-receiving means 440 to the height of the inner band portion 420b. The tongue-receiving means 440 may be in the form of a central tongue-receiving channel as disclosed in connection with FIGS. 12 and 13 or may be in the form of an opening beginning within the area of the step-like portions 421 as disclosed in my prior U.S. Pat. No. 4,315,348. In the illustrated embodiment of FIGS. 18 through 23, the tongue-receiving means 440 is formed in part of a centrally disposed opening 440' which commences within the area of the step-like portion 420 and is adjoined by a centrally-disposed tongue-receiving channel 440" for reasons to be explained hereinafter. Proceeding toward the outer band end portion 420a, a tab-like longitudinally extending guide hook 423 is followed by a second pressed-out inwardly extending tool-engaging embossment 424 that is followed by the inwardly extending support hook 425. The outer band portion 420a terminates in a tongue-like extension 430. The use of a tongue-receiving means formed in part by opening 440' and in part by tongue-receiving channel 440" is based on the recognition that it is preferable for the support hook 425 to be able to extend through an opening such as opening 400' when the clamp structure is in its closed preassembled, but not yet tightened position.

Figure 23:
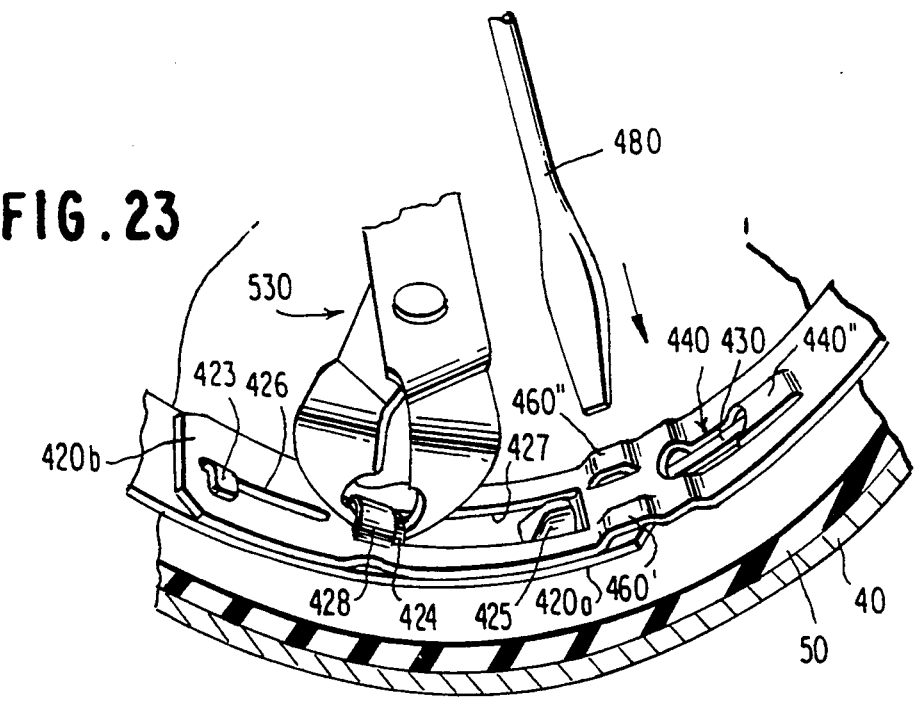
FIG. 23 is a partial perspective view, similar to FIG. 21 and illustrating how the installed clamp can be disassembled by the use of a conventional tool, such as a small screwdriver.

Further differing from the preceding embodiments, a tool-engaging disassembly means generally designated by reference numeral 460 is provided in the embodiment of FIGS. 18 through 23 which is constituted by lateral pressed-out inwardly extending embossments 460' and 460" disposed on both sides of the clamping band and located within the area between the step-like portions 421 and the end of the longitudinal opening 427 opposite the end of the inner band portion 420b. The disassembly tool-engaging embossments 460' and 460" are formed by longitudinal cuts leaving a central web portion 461 in the clamping band whereby the embossments 460' and 460" are pressed-out inwardly in a more or less semi-circular shape for insertion of a disassembly tool, such as a small screwdriver 480 to facilitate disassembly of the installed clamp (FIG. 23). These disassembly embossments 460' and 460" are provided on both sides of the clamping band so that the screwdriver can be inserted from either side in such a manner that it can also extend over the web portion 461.

Figure 24:
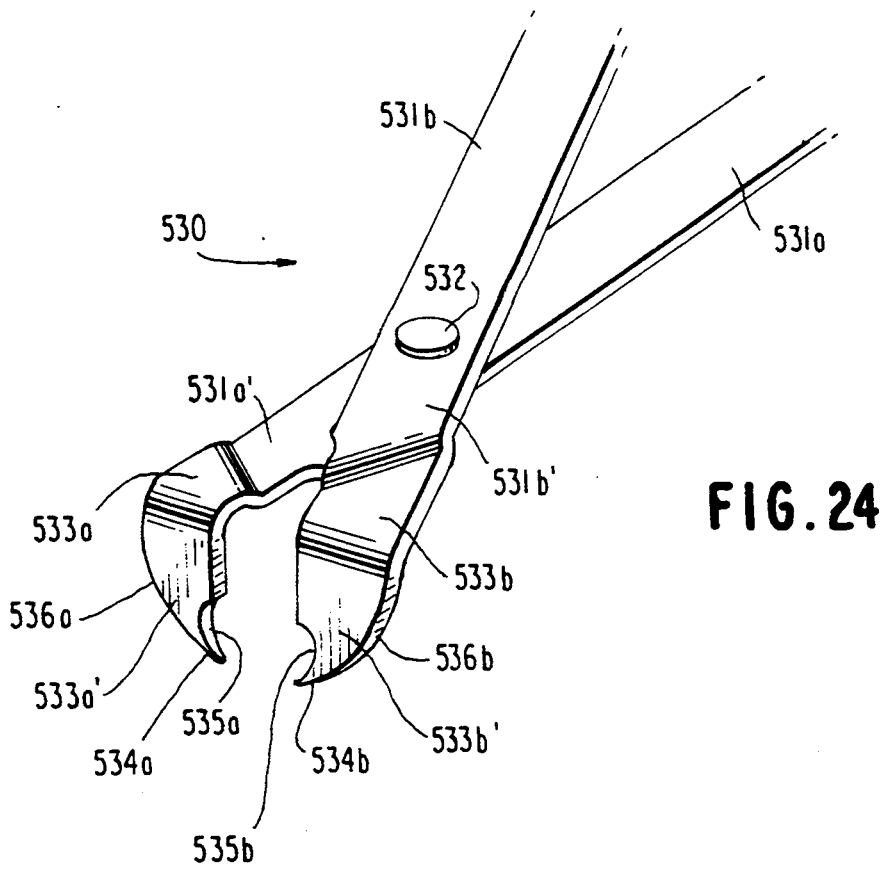
FIG. 24 is a perspective view of a special tool for installing and disassembling the clamp in accordance with the present invention.

FIG. 20 illustrates the clamp structure in its closed condition before it is tightened while FIG. 21 illustrates how the clamp is tightened by the use of a special tool generally designated by reference numeral 530 (FIG. 24).

FIG. 22 illustrates a modified arrangement for avoiding steps at the end of the outer band end portion 420a. As the clamp structures in accordance with the present invention are designed for specific predetermined hose sizes, the required diametric dimension as also the necessary location of the various parts in the longitudinal direction of the clamp are known beforehand. This being the case, it is possible to avoid the relatively long exposed tongue-like extension 130 of FIGS. 10 through 13 by so locating the step-like portions 421 as also the tongue-receiving means 440 in the inner band portion 420b that in the tightened condition, i.e., when the support hook 425 reaches its position corresponding to the tightened position of the clamp by engagement in elongated opening 427, the end of the outer band portion 420a lies spaced a small distance from the step-like portions 421 whereby the length of the exposed tongue-like extension 430, i.e., that portion outside the tongue-receiving means 440 can be kept relatively short. Moreover, the exposed tongue-like portion is reliably guided on the inner band portion. In other words, knowing the exact dimensions and locations of the various parts of the clamp, the clamp structure may be so designed that during tightening, i.e., expanding of the clamp structure the outer band end portion 420a has just moved beyond the step-like portions 421. The fact that during installation the outer band end portion 420a and its tongue-like extension 430 may form steps is of no consequence as such steps then disappear in the fully engaged position.

For purposes of disassembly, it is only necessary to apply by means of tool 530 an expanding force to the tool-engaging embossments 424 and 428 and insert the small screwdriver 480 into one of the tool-engaging embossments 460' or 460" and then twist the screwdriver which causes ready disengagement of the support hook 425 out of its corresponding aperture (elongated opening 427) in the inner band portion 420b.

The relocation of the narrow slot 426 and of elongated opening 427 as also of the step-like portions 421 in the embodiment of FIGS. 18 through 23 assures with greater reliability engagement of the support hook 425 in the opening 427 when the clamp structure reaches its tightened position. As to the rest, what was said in connection with the preceding embodiments applies equally to the embodiment of FIGS. 18 through 23.

FIG. 24 illustrates the special tool 530 for use with a clamp structure in accordance with the present invention which is installed by radial expansion thereof. The clamp structure includes two handle portions 531a and 531b which are pivotally connected with one another at 532. The corresponding parts 531a' and 531b' on the other side of the pivotal connection 532 are provided with oppositely directed step-like portions so that the jaw-like parts 533a and 533b are in the same plane. Because of the nature of the clamp and the requirement for its installation, the jaw-like end portions 533a' and 533b' are bent off at right angle with respect to the parts 533a and 533b and are formed with nose-like pointed end portions 534a and 534b for engagement in the tool-engaging embossments 424 and 428. These nose-like portions end 534a and 534b are formed in effect by the ground side surfaces 536a and 536b and the part-circularly shaped inner surfaces 535a and 535b forming a nearly circular opening therebetween.

The disassembly tool-engaging embossments 460' and 460" of the embodiment of FIGS. 18 through 23 may also be incorporated in an analogous manner in the preceding embodiments to facilitate disassembly.

The clamping band 11 of the various embodiments may also be provided with one or more sections adapted to impart elastic stretchability in the longitudinal direction of the clamping band, as disclosed in my prior U.S. Pat. No. 4,987,651, the subject matter of which is incorporated herein by reference. The use of such section(s) will permit the clamp structure, otherwise substantially devoid of elastic stretchability, to permit breathing of the hose in the presence of temperature and/or pressure fluctuations without affecting the holding ability of the clamp structure.

While I have shown and described several embodiments in accordance with the present invention, it is understood that the same is not limited thereto but is susceptible of numerous changes and modifications as known to those skilled in the art. For example, the various parts can be so located in relation to one another that the edge portion 24' comes to lie in the radial plane of the edge portion 28" when the clamp structure is in the desired expanded position. The tool-engaging portion 31b then comes into contact with the edge portion 28" and thus prevents over-torquing. The fastening tool 30 may also be of any other known configuration for such tools. Additionally, several support hooks 25 may be provided and/or a support hook 25 may be in the form of a combined guide and support hook as shown in my prior U.S. Pat. No. 4,622,720. I therefore do not wish to be limited to the details shown and described herein but intend to cover all such changes and modifications as are encompassed by the scope of the appended claims.

I claim:

1. A clamp structure adapted to provide holding forces by expansion of the diametric dimensions thereof, comprising clamping band means including outer and inner overlapping band portions, mechanical connecting means for connecting the overlapping band portions including aperture means in the inner band portion and hook-like means extending inwardly from the outer band portion for engagement with said aperture means in the inner band portion, said aperture means including an elongated opening in the inner band portion, first inwardly projecting tool-engaging means in the inner band portion located adjacent said elongated opening, second inwardly projecting tool-engaging means in the outer band portion, said second tool-engaging means being located adjacent said hook-like means so that applying a force to the first and second tool-engaging means seeking to draw the same toward each other causes the clamp structure to expand its diametric dimension and thereby produce said holding forces.

2. A clamp structure according to claim 1, wherein said aperture means includes an aperture for engagement by said hook-like means in the expanded condition of the clamp structure, said first tool-engaging means being located within the area between said elongated opening and said aperture, and wherein said second tool-engaging means is located between said hook-like means and the free end of the outer band portion.

3. A clamp structure according to claim 1, wherein said first tool-engaging means is located between said elongated opening and the free end of the inner band portion, and wherein said hook-like means is located between said second tool-engaging means and the free end of the outer band portion.

4. A clamp structure according to claim 1, further comprising guide means including an inwardly projecting, longitudinally extending tab-like member in the outer band portion operable to engage in a narrow slot in the inner band portion.

5. A clamp structure according to claim 4, wherein the first tool-engaging means is an inwardly pressed-out cold-deformed embossment whose length is determined by the end of the elongated opening nearer the free end of the inner band portion and a transverse cut in the clamping band means intermediate the end of the elongated opening and the free end of the inner band portion with the sides of the first tool-engaging embossment substantially integral with the remaining clamping band means.

6. A clamp structure according to claim 5, wherein said first tool-engaging means has an at least approximately semi-circular shape in transverse cross section.

7. A clamp structure according to claim 5, wherein said second tool-engaging means is an inwardly pressed-out cold-deformed embossment integral with the outer band portion except for a substantially transverse cut.

8. A clamp structure according to claim 5, wherein said second tool-engaging means has a cross-sectional shape substantially complementary to that of the first tool-engaging means and projects inwardly by such a distance that it can slide underneath the first tool-engaging means.

9. A clamp structure according to claim 5, wherein said hook-like means is an inwardly pressed-out cold-deformed support hook.

10. A clamp structure according to claim 4, wherein said clamp structure includes preassembly means to preassemble the clamp structure with the parts thereof in a position of reduced diametric dimensions compared to the desired expanded diametric dimensions in the installed condition.

11. A clamp structure according to claim 10, wherein said preassembly means is formed by a bent-over outer part of said tab-like member to hold the clamp structure in preassembled condition.

12. A clamp structure according to claim 10, wherein said hook-like means and said second tool-engaging means are so located in the inner and outer band portions that they extend inwardly through the elongated opening when the clamp structure is in its preassembled position.

13. A clamp structure according to claim 12, wherein, starting from the free end of the inner band portion toward the free end of the outer band portion, said aperture which is located within the end area of the inner band portion, is followed by the first tool-engaging means which is adjoined by the elongated opening, in turn followed by a narrow slot and proceeding toward the free end of the outer band portion is followed by the hook-like means, the second tool-engaging means and a tab-like member operable to engage in said slot to provide a guide function.

14. A clamp structure according to claim 10, wherein said aperture means further includes an aperture within the area of the clamp band means adjacent said elongated opening on the side thereof opposite the free end of the inner band portion, and wherein said hook-like means is so located in the clamping band means that it extends through said aperture in the preassembled position in which the second tool-engaging means extends through the elongated opening.

15. A clamp structure according to claim 1, wherein said first tool-engaging means has an at least approximately semi-circular shape in transverse cross section, and wherein said second tool-engaging means has a cross-sectional shape substantially complementary to that of the first tool-engaging means and projects inwardly by such a distance that it can slide underneath the first tool-engaging means.

16. A clamp structure according to claim 1, further comprising disassembly-facilitating means in the clamping band means to accommodate a disassembly tool for disengaging the hook-like means from the aperture means.

17. A clamp structure according to claim 16, wherein said disassembly-facilitating means includes inwardly pressed-out disassembly tool-engaging means providing in effect a laterally accessible opening.

18. A clamp structure according to claim 17, wherein said disassembly tool-engaging means are formed by lateral embossment means extending in the longitudinal direction of the clamping band means.

19. A clamp structure according to claim 18, wherein said lateral embossment means are located on both sides of corresponding longitudinal cuts in the clamping band means defining a central web portion remaining between the lateral embossment means.

20. A clamp structure according to claim 19, wherein said lateral embossments are of at least approximately part-circular shape as seen in side view.

21. A clamp structure for fixing a first part of softer material to a second part of harder material according to claim 1, wherein said second part has an internal surface substantially parallel to the external surface of the clamp structure, the first part is placed along the inner surface of said second part and the clamp structure is placed against the inner surface of the first part to hold the latter against the second part by expansion of the clamp structure.

22. The combination according to claim 21, wherein said second part has an annular recess into which the first part is pressed when the clamp structure is installed by expansion thereof.

23. A clamp structure according to claim 1, further comprising additional means to assure an outer clamping surface devoid of any step at the end of the outer band portion.

24. A clamp structure according to claim 23, wherein said additional means includes a tongue-like extension at the outer band portion adapted to engage in a tongue-receiving means in the inner band portion which begins at a step-like portion.

25. A clamp structure according to claim 24, wherein lateral band portions remain adjacent the tongue-receiving means, and wherein the step-like portion closer to the free end of the inner clamping band portion displaces the lateral band portions remaining on both sides of the centrally disposed tongue-receiving means radially inwardly by a distance substantially corresponding to the thickness of the clamping band means.

26. A clamp structure according to claim 24, wherein said tongue-receiving means is formed at least in part by a centrally disposed channel terminating in a second step-like portion.

27. A clamp structure according to claim 23, wherein said additional means includes a tongue-like means in one of the inner and outer band portions and tongue-receiving means in the other of the inner and outer band portions.

28. A clamp structure according to claim 27, wherein the tongue-like means is provided in the outer band portion and the tongue-receiving means is provided in the inner band portion.

29. A clamp structure according to claim 28, wherein said tongue-like means is formed at the end of the outer band portion and said tongue-receiving means is formed by pressed-out embossment means in the inner band portion forming an approximately U-shaped tongue-receiving channel.

30. A clamp structure according to claim 29, wherein said embossment means are pressed out from the inner band portion by a distance approximately corresponding to the thickness of the clamping band means and wherein the remaining lateral band portions on both external sides of the embossment means as well as the band portion intermediate the embossment means merge smoothly into said embossment means at the ends of the latter opposite the free end of the inner band portion.

31. A clamp structure according to claim 27, wherein said tongue-receiving means is formed by a substantially U-shaped fork-like part forming a tongue-receiving channel at the end of the outer band portion and the tongue-like means is formed by a pressed-out embossment means so located and of such shape as to be able to slide in and out of the channel formed by said U-shaped part.

32. A clamp structure according to claim 31, wherein said embossment means leaves on both sides thereof lateral band portions which merge smoothly into the outer surface of the embossment means at the end of the latter opposite the free end of the inner band portion.

33. A clamp structure according to claim 1, further comprising means preventing over-torquing during tightening of the clamp structure.

34. A clamp structure according to claim 33, further comprising means for preventing over-torquing during disassembly of the clamp structure.

35. A clamp structure according to claim 34, further comprising additional means to assure an outer clamping surface devoid of any step at the end of the outer band portion.

36. A clamp structure according to claim 35, wherein said additional means includes a tongue-like means at the outer band portion adapted to engage in a tongue-receiving means in the inner band portion formed intermediate two step-like portions.

* * * * *